United States Patent
Hong et al.

(10) Patent No.: US 9,621,841 B1
(45) Date of Patent: Apr. 11, 2017

(54) FRAME RATE CONVERSION BASED ON OBJECT TRACKING

(71) Applicant: Samsung Electronics Co., Ltd, Suwon-si (KR)

(72) Inventors: Hunsop Hong, Mountain View, CA (US); Yeong-Taeg Kim, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/986,554

(22) Filed: Dec. 31, 2015

(51) Int. Cl.
*H04N 7/01* (2006.01)
*H04N 19/577* (2014.01)

(52) U.S. Cl.
CPC ............ *H04N 7/01* (2013.01); *H04N 19/577* (2014.11)

(58) Field of Classification Search
CPC ...... H04N 7/01; H04N 19/577; H04N 7/0127; H04N 7/0135; H04N 7/0137; H04N 7/014; H04N 7/0142; H04N 7/0145; H04N 7/0157; H04N 19/51; H04N 19/513

USPC ........ 348/441, 458, 459, 451, 452, 448, 169
IPC ............................................... H04N 7/01,11/20
See application file for complete search history.

(56) References Cited

U.S. PATENT DOCUMENTS

2008/0285656 A1* 11/2008 Au ..................... H04N 19/563
375/240.22
2013/0044183 A1* 2/2013 Jeon .................... H04N 19/103
348/43

* cited by examiner

*Primary Examiner* — Sherrie Hsia

(57) ABSTRACT

A method, apparatus, and computer readable medium for frame rate conversion based on object tracking. The method includes determining whether a block of a first frame of an input video stream corresponds to a detected object region or a non-object region. The method further includes selecting a motion estimation operation from a group of operations comprising an object tracking operation based at least on the determining of whether the block of the first frame corresponds to the detected object region or the non-object region. The method further includes determining a motion vector of the block by performing the selected motion estimation operation and determining an interpolated frame based at least on the determined motion vector and the first frame and a second frame of the input video stream.

20 Claims, 6 Drawing Sheets

FRAME RATE CONVERSION BASED ON OBJECT TRACKING

TECHNICAL FIELD

This disclosure relates generally to a video stream processing system. More specifically, this disclosure relates to method and apparatus for frame rate conversion based on object tracking.

BACKGROUND

A frame rate conversion (FRC) system using a temporal interpolation technique may provide smooth watching experiences to users. The interpolation technique relies on a motion compensation (MC) technique that requires precise motion estimation (ME). However, an ME technique has been a challenging task especially for a small object that has higher speed motion sequences such as a ball in sports broadcasts since the ball takes a small amount of the footage in an image plane and has different stochastic characteristics than a background image. This is particularly challenging for tracking of an object that has higher speed motion sequences.

SUMMARY

Embodiments of the present disclosure frame rate conversion based on object tracking.

In one embodiment, a method for frame rate conversion is provided. The method includes determining whether a block of a first frame of an input video stream corresponds to a detected object region or a non-object region. The method further includes, based at least on the determining of whether the block of the first frame corresponds to the detected object region or the non-object region selecting a motion estimation operation from a group of operations comprising an object tracking operation. The method further includes determining a motion vector of the block by performing the selected motion estimation operation and determining an interpolated frame based at least on the determined motion vector and the first frame and a second frame of the input video stream.

In another embodiment, an apparatus to convert frame rate is provided. The apparatus includes memory and at least one processor operably connected to the memory. The at least one processor is configured to determine whether a block of a first frame of an input video stream corresponds to a detected object region or a non-object region. The at least one processor is further configured to, in response to a determination that the block corresponds to the detected object region, select a motion estimation operation from a group of operations comprising an object tracking operation, determine a motion vector of the block by performing an object tracking operation. The at least one processor is further configured to determine an interpolated frame based at least on the determined motion vector and the first frame and a second frame of the input video stream.

In another embodiment, a non-transitory computer readable medium is provided. The non-transitory computer readable medium includes program code, that when executed by at least one processor, causes the at least one processor to determine whether a block of a first frame of an input video stream corresponds to a detected object region or a non-object region; based at least on the determining of whether the block of the first frame corresponds to the detected object region or the non-object region, select a motion estimation operation from a group of operations comprising an object tracking operation; determine a motion vector of the block by performing the selected motion estimation operation; and determine an interpolated frame based at least on the determined motion vector and the first frame and a second frame of the input video stream.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc, an erasable memory device, a volatile memory device, or a non-volatile memory device.

Various functions described below can be implemented or supported by a processor coupled to a computer readable medium storing one or more computer programs. As such, the processor is a special purpose processor for performing the functions defined by the one or more computer programs.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged FRC system.

An FRC system comprising ME and CE techniques usually increases frame rates by interpolating between the same objects in two image frames. An ME technique is required to match the same objects in two frames and an MC technique is used to generate interpolated frames using estimated motion vectors provided by the ME technique. However, the ME technique is one of challenging tasks especially when a target object has a small footage and a motion of the target object (such as object region) is different than a background motion (such as a motion of non-object region). In such situation, the motion of the target object (such as ball tracking sequences in a video stream for sports games) is translated to a small sample that has different stochastic characteristics.

Figure 1:
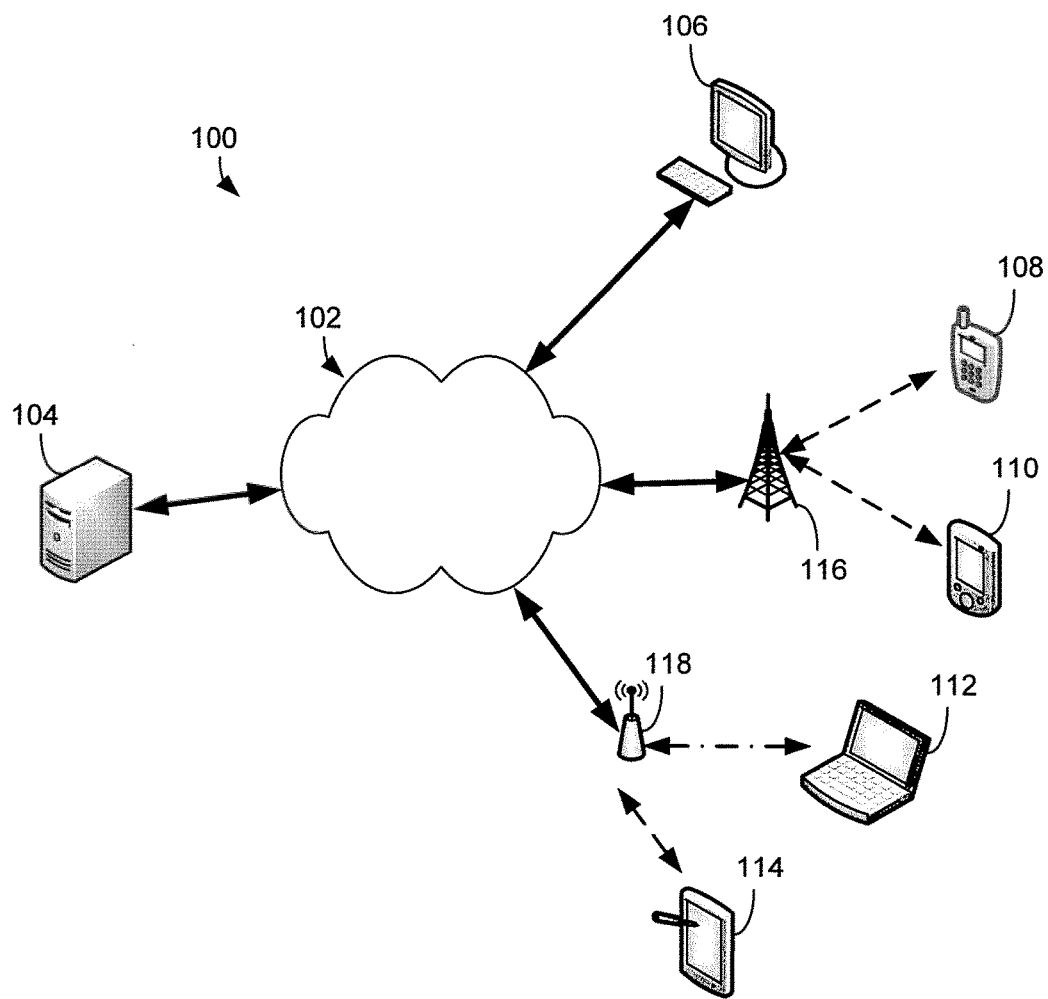
FIG. 1 illustrates an example communication network according to one embodiment of this disclosure.

FIG. 1 illustrates an example communication network 100 according to this disclosure. The embodiment of the communication network 100 shown in FIG. 1 is for illustration only. Other embodiments of the communication network 100 could be used without departing from the scope of this disclosure. As shown in FIG. 1, the communication network 100 includes a core network 102, which facilitates communication between various components in the communication network 100. For example, the core network 102 may communicate Internet protocol (IP) packets, frame relay frames, asynchronous transfer mode (ATM) cells, or other information between network addresses. The core network 102 may include one or more local area networks (LANs), metropolitan area networks (MANs), wide area networks (WANs), all or a portion of a global network such as the Internet, or any other communication system or systems at one or more locations.

The core network 102 facilitates communications between at least one server 104 and various client devices 106-114. Each server 104 includes any suitable computing or processing device that can provide communication services for one or more client devices. Each server 104 could, for example, include one or more processing devices, one or more memories storing instructions and data, and one or more network interfaces facilitating communication over the core network 102.

Each client device 106-114 represents any suitable computing or processing device that interacts with at least one server or other computing device(s) over the core network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the communication network 100.

In this example, some client devices 108-114 communicate indirectly with the core network 102. For example, the client devices 108-110 communicate via one or more base stations 116, such as cellular base stations or eNodeBs (eNBs). Also, the client devices 112-114 communicate via one or more wireless access points 118, such as IEEE 802.11 wireless access points. Note that these are for illustration only and that each client device could communicate directly with the core network 102 or indirectly with the core network 102 via any suitable intermediate device(s) or network(s).

A video streaming service may communicate among some client devices 108-114 through the core network 102. In this case, the core network 102 may transmit the video stream to the client devices with a minimized delay and a high throughput. In one embodiment, the client devices 108-114 may communicate each other without the core network 102. The video stream service may be provided by a stream server (not shown) in the core network 102 or a video stream service agent (not shown) on the client devices 108-114 that control video frames included in the video stream. The video frames may be manipulated to provide a higher quality of service (QoS), for example, a higher throughput, a lower delay, a lower bandwidth requirement, by an FRC system. The FRC system provides smooth watching experience by temporal interpolation technique between the video frames. More specifically, an FRC system based on object detection may be effective for small object (such as object region) detecting and tracking such as ball movement in sports game since it takes small footage in image plane and has different stochastic characteristic from a background image (such as non-object region).

Regardless of the video content or network configuration, an FRC may be applied to motion pictures (such as film or television) that are composed of a series of rapidly changing still images, or frames, generated from real-world. A frame rate of the series of rapidly changing still images in the motion picture may be converted between fractionally adjacent speeds.

For example, an FRC may be used in televisions, a video compression, a video format conversion, quality enhancement, a stereo vision, and other applications involving multiple video formats. In such examples, an FRC may be used to convert a slower frame rate to a faster frame rate using duplicating frames or fields. For example, some computer systems and tape formats have chosen to convert frame rate (such as 24 to 30) by simply duplicating frames. In one example, an FRC may be used by a display device to conform a frame rate of an input video stream that does not match the frame rate supported by the device. In another example, an FRC may be used for a video coding and decoding scheme, where the FRC may be implemented in a video codec system.

Although FIG. 1 illustrates one example of a communication network 100, various changes may be made to FIG. 1. For example, the communication network 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
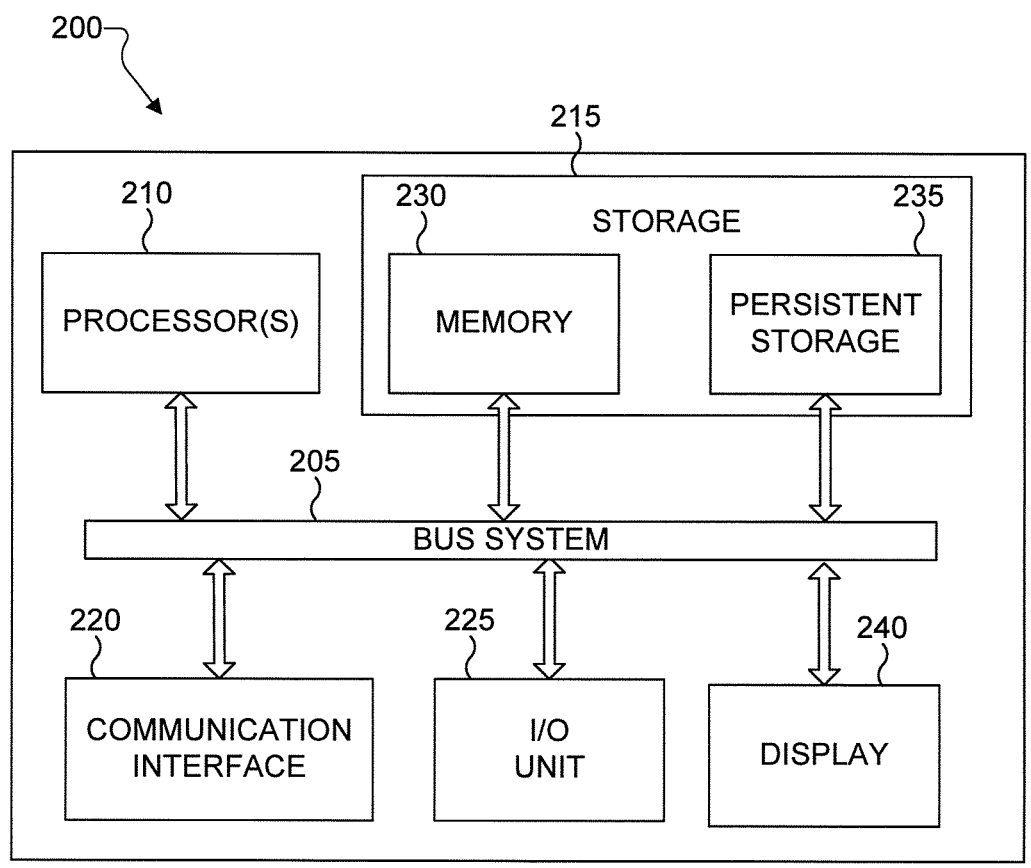
FIG. 2 illustrates an example server in a computing system according to one embodiment of this disclosure.
Figure 3:
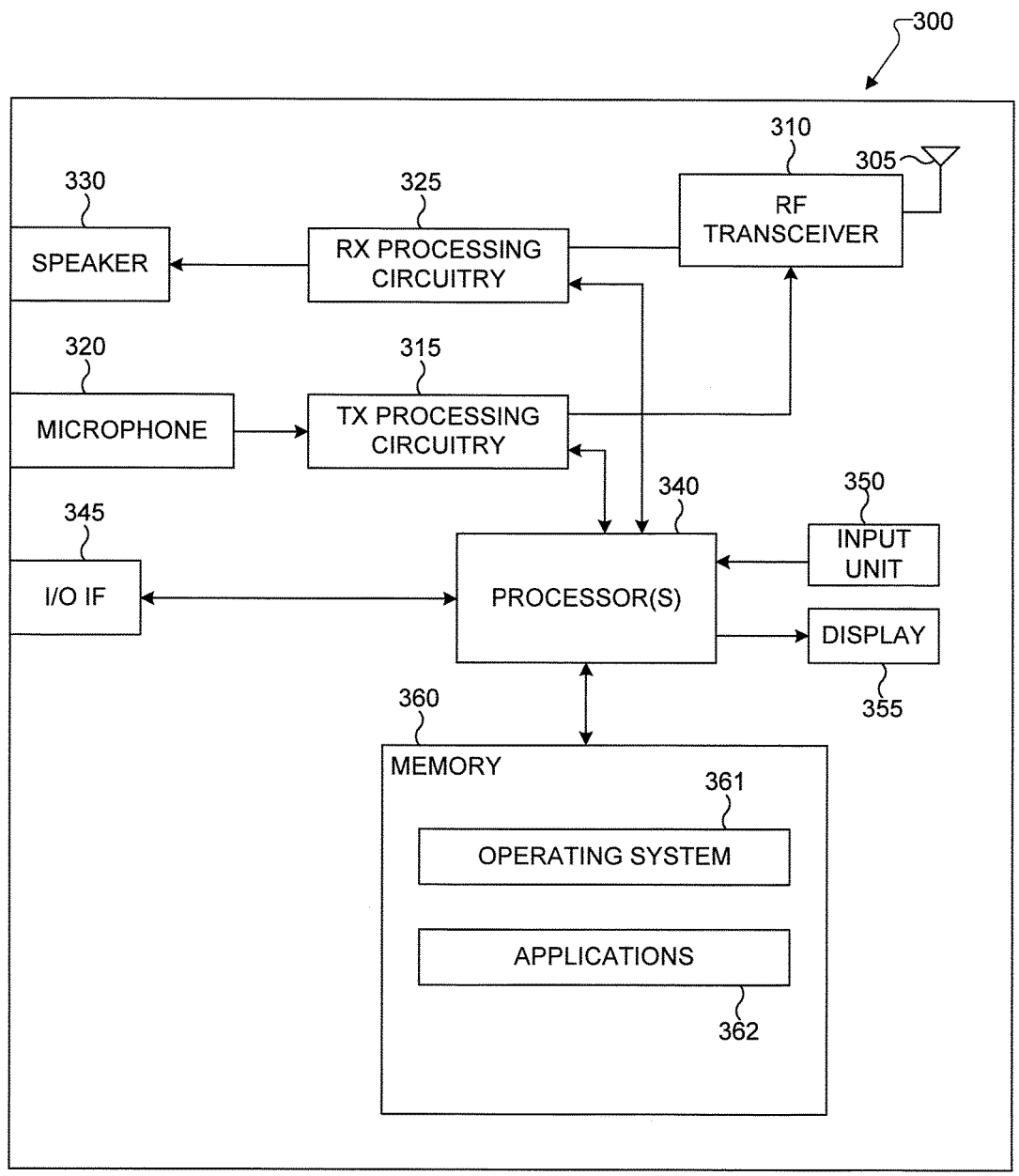
FIG. 3 illustrates an example device in a computing system according to one embodiment of this disclosure.

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between at least one processor 210, at least one storage 215, at least one communication interface 220, at least one input/output (I/O) unit 225, and at least one display 240.

The processor 210 executes instructions that may be loaded into a memory 230. The processor 210 may include any suitable number(s) and type(s) of processors or other devices in any suitable arrangement. Example types of the processor 210 include microprocessors, microcontrollers, digital signal processors, field programmable gate arrays, application specific integrated circuits, discreet circuitry, and video stream processors.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, flash memory, or optical disc. The display 240 may include a panel, a hologram device, or a projector to display any object (such as a text, a video, an image, a graphic and/or other suitable information). The storage device 215 includes a program code, that when executed by the processor 210 to perform an FRC for an input video stream, cause the processor 210 to determine whether a block of a first frame of an input video stream corresponds to a detected object region or a non-object region, select a motion estimation operation from a group of operations comprising an object tracking operation, determine a motion vector of the block by performing the selected motion estimation operation, and determine an interpolated frame based at least on the determined motion vector and the first frame and a second frame of the input video stream.

The storage device 215 further includes a program code, that when executed by the processor 210 to perform an FRC for an input video stream, cause the processor 210 to identify a boundary of the detected object region each of the first frame and the second frame of the input video stream and identify a boundary of the block each of the first frame and the second frame of the input video stream using a block mask.

The storage device 215 further includes a program code, that when executed by the processor 210 to perform an FRC for an input video stream, cause the processor 210 to generate the motion vector based on a center position of each block of the first frame and the second frame of the input video stream corresponds to the detected object region or the non-object region and search of the block in accordance with the motion vector to generate an estimated motion vector.

The communication interface 220 supports communications with other systems or devices. For example, the communication interface 220 could include a network interface card or a wireless transceiver facilitating communications over the network 102. The communication interface 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

For video streaming service, the at least one processor 210 may be implemented as an FRC processor, or one or more processor (not shown) may be added with the at least one processor 210 to process the video streaming. The FRC processor implemented on the at least one processor 210 or as independent processor (not shown) co-working with the at least one processor 210 may employ an ME technique and an MC technique. An interpolation technique that provides some interpolated frames between two frames included in the video stream relies on the MC and the ME techniques implemented in the FRC system. The video stream that has been processed by the MC and ME may be displayed at least one display 240.

The processor 210 may be applied to motion pictures (such as film or television) that are composed of a series of rapidly changing still images, or frames, generated from real-world. A frame rate of the series of rapidly changing still images in the motion picture may be converted between fractionally adjacent speeds.

For example, the processor 210 may be used in televisions, a video compression, a video format conversion, quality enhancement, a stereo vision, and other applications involving multiple video formats. In such examples, the processor 210 may be used to convert a slower frame rate to a faster frame using duplicating frames or fields. For example, some computer systems and tape formats have chosen to convert frame rate (such as 24 to 30) by simply duplicating frames. In one embodiment, the processor 240 may be used by a display device to conform a frame rate of an input video stream that does not match the frame rate supported by the device. In another embodiment, the processor 240 may be used for a video coding and decoding scheme, where the FRC may be implemented in a video codec system.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, at least one processor 340, an input/output (I/O) interface (IF) 345, an input device 350, a display 355, and a memory 360. The memory 360 includes an operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the client device 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The main processor 340 is also coupled to the I/O interface 345, which provides the client device 300 with the ability to connect to other devices such as laptop computers and handheld computers. The I/O interface 345 is the communication path between these accessories and the processor 340.

The processor 340 is also coupled to the input unit 350 and the display unit 355. The operator of the client device 300 can use the input unit 350 to enter data into the client device 300. The display 355 may be a liquid crystal display or other display capable of rendering text and/or at least limited graphics, such as from web sites.

The processor 340 may be applied to motion pictures (such as film or television) that are composed of a series of rapidly changing still images, or frames, generated from real-world. A frame rate of the series of rapidly changing still images in the motion picture may be converted between fractionally adjacent speeds.

For example, the processor 340 may be used in televisions, a video compression, a video format conversion, quality enhancement, a stereo vision, and other applications involving multiple video formats. In such examples, the processor 340 may be used to convert a slower frame rate to a faster frame using duplicating frames or fields. For example, some computer systems and tape formats have chosen to convert frame rate (such as 24 to 30) by simply duplicating frames. In one embodiment, the processor 340 may be used by a display device to conform a frame rate of an input video stream that does not match the frame rate supported by the device. In another embodiment, the processor 340 may be used for a video coding and decoding scheme, where the FRC may be implemented in a video codec system.

The memory 360 is coupled to the processor 340. Part of the memory 360 could include a random access memory (RAM), and another part of the memory 360 could include a Flash memory or other read-only memory (ROM).

For video streaming service, the processor 340 may be implemented as an FRC processor or processors to process the video stream. The FRC processor implemented on the processor 340 or as independent processor co-working with the processor 340 may employ an ME technique and a MC technique. An interpolation technique that provides some interpolated frames between two frames included in the video stream relies on the MC and the ME techniques implemented in the FRC system. More specifically, an FRC system based on object detection may be effective for small object detecting and tracking such as ball movement in sports game since the ball takes small footage in image plane and has different stochastic characteristic from a background image. The video stream that has been processed by the MC and the ME may be displayed at least one display 355.

The memory 360 includes a program code, that when executed by the processor 340 to perform an FRC for an input video stream, cause the processor 340 to determine whether a block of a first frame of an input video stream corresponds to a detected object region or a non-object region, select a motion estimation operation from a group of operations comprising an object tracking operation, determine a motion vector of the block by performing the selected motion estimation operation, and determine an interpolated frame based at least on the determined motion vector and the first frame and a second frame of the input video stream.

The memory 360 further includes a program code, that when executed by the processor 340 to perform an FRC for an input video stream, cause the processor 340 to identify a boundary of the detected object region each of the first frame and the second frame of the input video stream and identify a boundary of the block each of the first frame and the second frame of the input video stream using a block mask.

The memory 360 further includes a program code, that when executed by the processor 340 to perform an FRC for an input video stream, cause the processor 340 to generate the motion vector based on a center position of each block of the first frame and the second frame of the input video stream corresponds to the detected object region or the non-object region and search of the block in accordance with the motion vector to generate an estimated motion vector.

Although FIGS. 2 and 3 illustrate examples of devices in a computing and communication system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
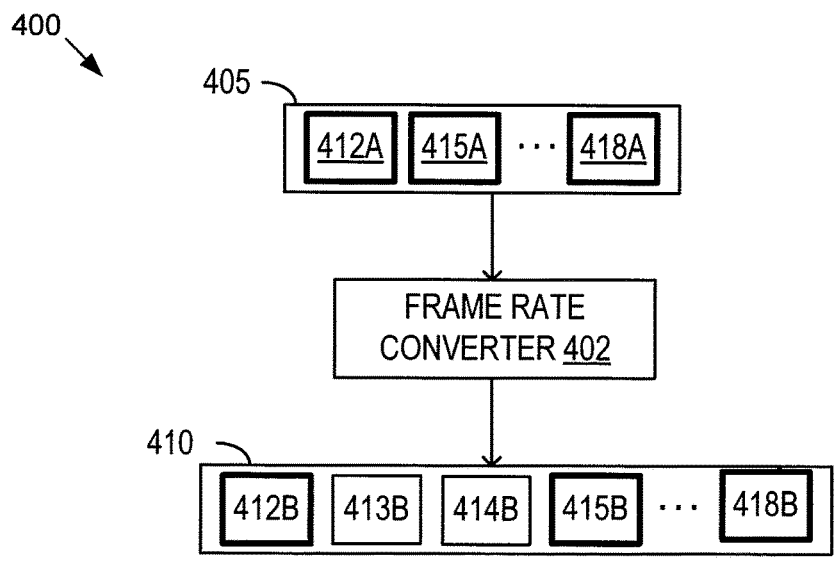
FIG. 4 illustrates an example of an FRC operation for a video stream according to one embodiment of this disclosure.

FIG. 4 illustrates an example of an FRC operation 400 for a video stream according to this disclosure.

The embodiment of the FRC 400 illustrated in FIG. 4 is for illustration only, and the FRC operation 400 of FIG. 4 could have the same or similar configuration. Also, various components in FIG. 4 could be combined, further subdivided, or omitted and additional components could be added according to particular needs, and FIG. 4 does not limit the scope of this disclosure to any particular implementation of an FRC operation.

As illustrated in FIG. 4, the FRC operation 400 comprises a frame rate converter 402, an input 1 video stream 405, a processed output video stream 410, and a set of interpolated frames 413B, 414B. More specifically, the input video stream 405 comprises a set of original input video frames 412A, 415A through 418A (such as S frames), and the processed output video stream 410 comprises a e set of processed video frames 412B, 415B through 418B and the set of interpolated frames 413B, 414B (such as S-N frames)

The FRC 402 converts a frame rate of the input video stream 405 using an interpolation technique in a way that provides smooth watching experience to users. For example, the output video stream 410 may comprises the processed video frames with a higher frame rate or a lower frame than the input video stream 405. In such situation, the FRC 402 provides a video frame compression, a video format conversion, a quality enhancement, and/or a stereo vision. In one embodiment, an FRC operation is needed to playback 50 Hz video sequence using a television (TV) set with 100 Hz frame rate.

An FRC technique increases a total number of frames in an input video stream because the FRC operation inserts new frames (such as interpolated frames 413B and 414B) between each pair of neighbor frames of the input video frames (such as 412A and 415A). The number of interpolated frames (such as 413B and 414B) is defined by an interpolation factor.

Figure 5:
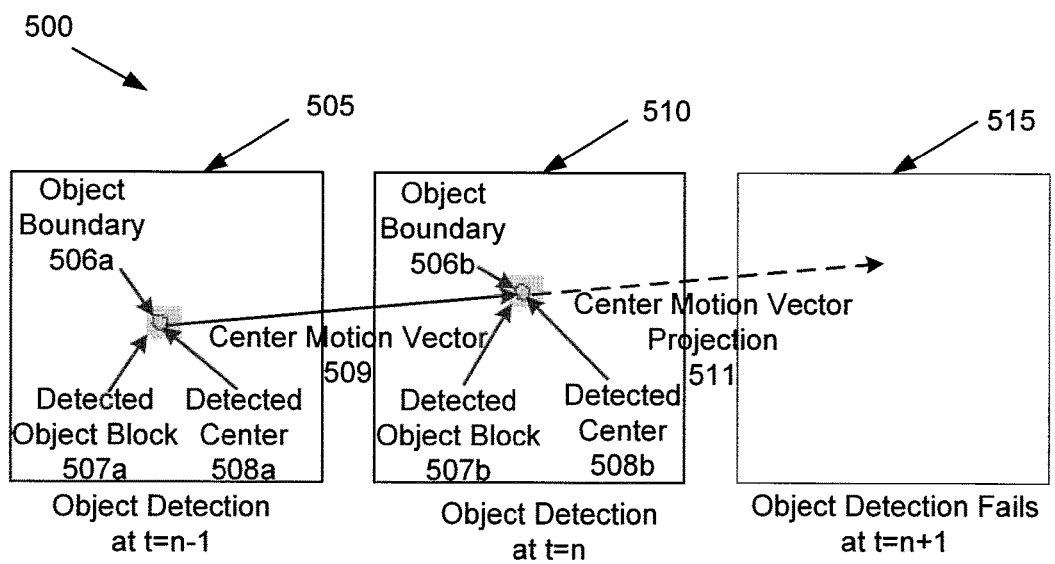
FIG. 5 illustrates a flow chart of a method for an object detection technique by an FRC system according to one embodiment of this disclosure.

FIG. 5 illustrates an example of block level motion estimation 500 according to this disclosure. The embodiment of the block level motion estimation 500 illustrated in FIG. 5 is for illustration only, and the block level motion estimation 500 of FIG. 5 could have the same or similar configuration. Also, various components in FIG. 5 could be combined, further subdivided, or omitted and additional components could be added according to particular needs, and FIG. 5 does not limit the scope of this disclosure to any particular implementation of block level motion estimation.

As illustrated in FIG. 5, the block level motion estimation 500 comprises an object detection at t=n−1 stage 505 (such as n−$1^{th}$ frame), an object detection at t=n stage 510 (such as $n^{th}$ frame), and an object detection at t=n+1 stage (such as n+$1^{th}$ frame) 515.

The block level motion estimation 500 illustrated in FIG. 5 uses a ball detection technique as an example of object detection method. In the block level motion estimation 500, object boundaries 506a, 506b at each frame 505, 510, respectively are estimated, and then detected object blocks 507a, 507b are generated based on an object map that is determined by a set of blocks comprising object boundary in the block. Subsequently, center block positions 508a and 508b of the object are estimated. An example embodiment determines the center block position by averaging of the positions of the detected neighboring object blocks (such as based on location information) that are connected with each other. In one embodiment, a location of each edge pixel in one block is averaged to estimate a center position of the given block. In another embodiment, a center position of neighboring detected block is averaged to estimate a center position of the given block.

Next, a block level motion vector 509 (such as a center motion vector) is estimated by comparing location information of the center positions 508a and 508b of the objects in consecutive frames, for example, the $n^{th}$ frame 510 and the n−$1^{th}$ frame 505. Finally, the center motion vector 509 estimated in the $n^{th}$ frame 510 and the n−$1^{th}$ frame 505 is used for pixel level motion estimation as a candidate center position for refining full search in order to reduce computational complexity.

If an object detection fails at t=n+1 stage 515 (such as n+$1^{th}$ frame), the center motion vector 509 between t=n−1 stage 505 (such as n−$1^{th}$ frame) and t=n stage 510 (such as $n^{th}$ frame) is used as a projection to track the object.

Figure 6:
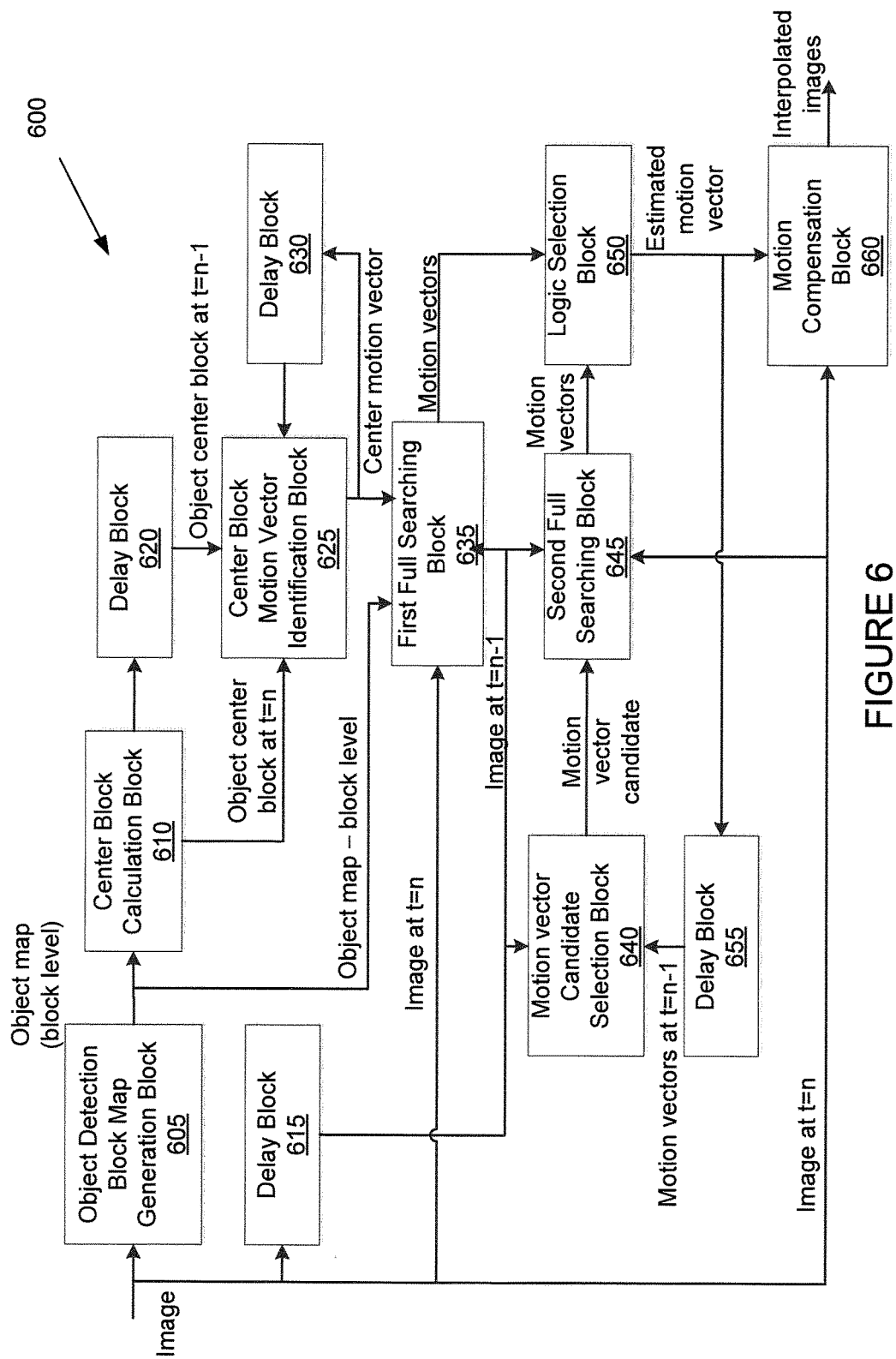
FIG. 6 illustrates a block diagram of an FRC system that uses an object detection technique according to one embodiment of this disclosure.

FIG. 6 illustrates a block diagram of an FRC system 600 that uses an object detection technique according to this disclosure. The embodiment of the FRC system 600 illustrated in FIG. 6 is for illustration only, and the FRC system 600 of FIG. 6 could have the same or similar configuration. Also, various components in FIG. 6 could be combined, further subdivided, or omitted and additional components could be added according to particular needs, and FIG. 6 does not limit the scope of this disclosure to any particular implementation of an FRC system. For example, the FRC system 600 illustrated in FIG. 6 may be implemented in the client devices 108-114. In one example, the FRC system 600 illustrated in FIG. 6 may be implemented in the servers 104, 200. In another example, the FRC system illustrated in FIG. 600 may be implemented in the core network 102.

As illustrated in FIG. 6, the FRC system 600 that uses an objection detection technique comprises an object detection block map generation block 605, center block calculation block 610, a plurality of delay blocks 615, 620, 630, 655, a center block motion vector identification block 625 that finds a motion vector of center blocks and provides a projection with only one center, a first full searching block 635 (such as a first ME) that provides a full searching at the center motion vector, a motion vector candidate selection block 640, a second full searching block 645 (such as a second ME) that provides a full searching at the selected candidate, a logic selection block 650, and an MC block 660.

The object detection block map generation block 605 detects some objects (such as a ball in sports sequences) from an input video stream that is divided into a grid of blocks, for example 3×3 pixel blocks, to determine which of blocks correspond to a detected object based on the detected object block map. In one example, some objects are detected by an edge detection logic scheme. Respective blocks are transferred to either the first full searching block 635 (such as the first ME) or the second full searching block 645 (such as the second ME) based on whether the blocks includes at least part of the detect object or not based on the detected object map. A detected object block (such as 507) can be larger than a single block (such as 506).

The blocks of the detected object are transferred to the first full searching block 635 (such as first ME) to determine the motion vector of the center block of the detected object. For each block of the detected object, the first full searching block 635 performs a full searching to determine the motion vector of the detected object blocks using the motion vector of the center block. The blocks that do not correspond to a detected object are transferred to the second full searching block 645 to determine the motion vector of the detected object. A motion vector of a neighboring block or a motion vector of the previous frame is used to initialize the search area for each block.

The center block calculation block 610 detects center blocks (such as 508). Since the detected area (such as 507) is larger than one block (such as 506), the center block calculation block 610 detects (such as determines) center positions of neighboring blocks. The center positions of neighboring blocks are obtained by averaging of the positions of the detected neighboring object blocks that are connected with each other. In one example, a location of each edge pixel in one block is averaged to estimate the center of the given block. In another example, a location of neighboring detected block's center position is averaged to estimate a center position of the object.

In an example, a center position of the blocks (such as 508) is attained by averaging of the center positions of the neighboring blocks (such as based on location information). The center block calculation block 610 transmits the center position of the object to the delay 620 at t=n−1 stage and to the center block motion vector identification block 625 at t=n stage.

The center block motion vector identification block 625 finds a motion vector of the blocks and provides a projection with the center position of the blocks (such as using motion estimation) for the estimation of the motion vector in the next frame of the input video stream. In on example, one motion vector is valid to one pair of connection (such as adjacent frames). The center block motion vector identification block 625 estimates a ball motion with the current ball map and previous ball map using a simple matching operation of the blocks.

If the ball does not exist in a given search range, the detection by the center block motion vector identification block 625 is failed. Subsequently, a previous motion vector from the delay block 620 (such as a center motion vector projection) is assigned to the center block motion vector identification block 625.

In one embodiment, an estimated center block motion vector is obtained in accordance with $p\_n=p\_{(n-1)}1$, where $p\_n$ is a center location at a frame n (such as the $n^{th}$ frame at t=n stage) and $p\_(n-1)$ is a center location at a frame n−1 (such as the $n-1^{th}$ frame at t=n−1 stage) when a detection at the center block motion vector identification block 625 is succeeded. Accordingly, the center block motion vector identification block 625 determines a motion vector connecting the center positions of blocks between consecutive frames (such as block-level motion estimation).

The first full searching block 635 provides a full searching at the center motion vector provided by the center block motion vector identification block 625. In addition, the second full searching block 645 performs a full searching in a vicinity of an object (such as a location of a ball center) and estimates a ball motion vector. In one embodiment, a recursive ME technique is used within the second full searching block 645. The recursive ME technique is considered as a procedure to pick a candidate motion vector based on neighboring blocks using a criteria (such as sum of absolute difference (SAD)). However, since the candidate motion vector from neighboring pixels is not an exact matched motion, a full (such as exhaustive) searching operation is performed. For example, a searching range of a normal full search (such as a block matching algorithm (BMA)) is 17×17 points (such as −8~8 for x, −8~8 for y, then 17×17 points) for a zero-centered search. However, the search range is reduced to (−8+candidate dx~8+candidate dx for x) and (−8+candidate dy~8+candidate dy for y) using a motion vector. In such instance, more probable areas for correcting a motion vector are captured while providing the same level of computational burden.

In one example, when an estimated ball motion is (+2, +3) and 8×8 size block is used, an actual motion vector is (+16, +24). Therefore, a searching range for a full searching becomes (−8+16, 8+16) for x axis and (−8+24, 8+24) for y axis (17×17 points).

The motion vector candidate selection block 640 selects a candidate from motion vectors of neighboring blocks and a previous frame. For example, a scan order from left to right scan is defined as a sequence as follows;

DDDDDDDDDDDDDDDDDDD
DDDDDDDDDCNNNNNNN
NNNNNNNNNNNNNNNN where D (such as done) denotes that an ME has been performed (such as block has one candidate of a current frame), C (such as current) denotes a current block, and N (such as not done) denotes that the ME has not been performed yet.

In one example, a motion estimation is performed in accordance with a recursive scheme. In this example, the aforementioned sequence describes the existing motion vector candidate stored in a memory (such as 215, 360). More specifically, a block denoted as D includes at least one candidate of a current frame and a block denoted as C includes at least one candidate of a previous frame. Accordingly, some candidates from the current frame and previous frame are selected since a result for an N block is not attained yet.

The second full searching block 645 performs a full searching at the selected candidate. The logic selection block 650 picks one of the motion vectors from an object tracking (such as a ball tracking) and normal recursive ME (such as based on sum of absolute difference (SAD)). The MC block 660 performs an interpolation using the estimated motion vectors.

In some embodiments, an estimated object center block motion vector is used as a center of full searching (such as BMA). In addition, the estimated object center block motion vector is compared with the estimated motion vector from a recursive ME technique to dramatically reduce computational burdens especially when the object and background motions are different each other. The estimated motions are fed into the MC block 660 to interpolate frames without artifacts. As illustrated in FIG. 6, the first full searching block 635 receives candidates from a block motion and the second full searching block 645 receives motion vector candidates.

Figure 7:
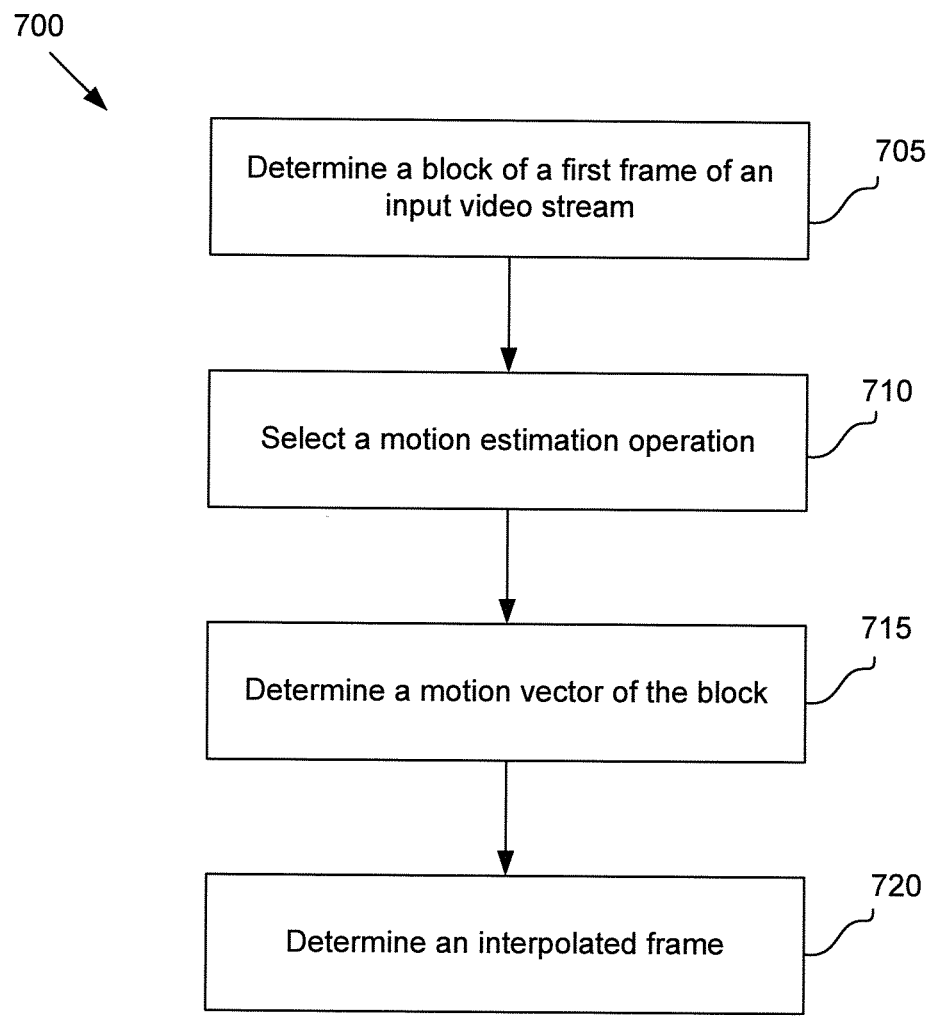
FIG. 7 illustrates a flowchart of a method for an object detection technique by an FRC system according to one embodiment of this disclosure.

FIG. 7 illustrates a flow chart of a method 700 for an object detection technique using an FRC system according to this disclosure. In this embodiment, the method 700 can be implemented by the FRC system 600 as discussed above with regard to FIG. 6. In one example, the processor 210 and the storage device 215 illustrated in FIG. 2 may perform the functions of the method 700 to provide object detection and tracking for the FRC system 600. In another example, the processor 340 and the memory 360 illustrated in FIG. 3 may perform the functions of the method 700. In yet another example, the blocks 605-660 illustrated in FIG. 6 may perform the functions of the method 700 to provide object detection and tracking for the FRC system 600. While particular blocks of the method 700 are described below as being performed by specific blocks of one of the FRC system 600, it will be understood that any suitable block can perform each of the blocks of the method 700 in alternative example embodiments.

The embodiment of the method 700 using the object detection technique illustrated in FIG. 7 is for illustration only, and the method 700 using the object detection technique of FIG. 7 could have the same or similar configuration. Also, various components in FIG. 7 could be combined, further subdivided, or omitted and additional components could be added according to particular needs, and FIG. 7 does not limit the scope of this disclosure to any particular implementation of the FRC system 600 using an object an object detection technique.

As illustrated in FIG. 7, the method 700 begins at block 705, where the FRC system 600 determines a block of a first frame of an input video stream. For example, block 705 may be implemented by blocks 605-620 in FIG. 6 discussed above. In this block, the FRC system 600 determines the block of the first frame of the input video stream (such as 405 in FIG. 4) corresponding to a detected object region or a non-object region. In one embodiment, the determination of the block of the first frame is performed based on identification of a boundary of the detected object region as discussed above with regard to 506a in FIG. 5 and a boundary of the block in each of the first frame and a second frame of the input video stream as discussed above with regard to 507a and 507b in FIG. 5. In such embodiment, the boundary of the block is identified using a block mask and the detected object block (such as 507 in FIG. 5) can be larger than a single block (such as 506 in FIG. 5). For example, an example process of performing block 705 is described above in greater detail in connection with block 605 of FIG. 6.

Next, the method 700 proceeds to block 710, where the FRC system 600 selects a motion estimation operation from a group of operations. For example, block 710 may be implemented by blocks 625-650 in FIG. 6 discussed above. In this block, the group of operations for the selection of the motion estimation operation may include an object tracking operation as discussed above with regard to 509 in FIG. 5. More specifically, the object tracking operation is performed based at least on the determining of whether the block of the first frame corresponds to the detected object region or the non-object region. In one embodiment, the group of operations comprises a block matching operation. For example, an example process of performing block 710 is described above in greater detail in connection with block 625 of FIG. 6.

Subsequently, the method 700 proceeds to block 715, where the FRC system 600 determines a motion vector of the block. For example, block 715 may be implemented by any one of the blocks 625-655 in FIG. 6 as discussed above. In this block 715, the FRC system 600 performs the selected motion estimation operation to determine the motion vector of the block (such as 511 in FIG. 5) based on a center position of each block of the first frame and the second frame of the input video stream (such as 509 in FIG. 5) corresponding to the detected object region or the non-object region. In one embodiment, the motion vector determined at block 715 is implemented as a block-level motion vector. In this block 715, the FRC system 600 performs full searching of the block in accordance with the motion vector (such as 509 in FIG. 5) to generate an estimated motion vector (such as 511 in FIG. 5). In one embodiment, the estimated motion vector generated at block 715 is implemented as a recursive motion vector representing a pixel-level motion of the detected object regions and the non-object region. For example, an example process of performing block 715 is described above in greater detail in connection with blocks 635 and 645 of FIG. 6.

Finally, the method 700 proceeds to block 720, where the FRC system 600 determines an interpolated frame. For example, the block 720 may be implemented by any one of the systems 210 and 251 in FIGS. 2, 340 and 360 in FIG. 3, or 660 in FIG. 6 as discussed above. In this block 720, the interpolated frame (such as 413B and 414B in FIG. 4) can be generated based at least on the determined motion vector, and the first frame and the second frame of the input video stream as discussed above with regard to 405 in FIG. 4. For example, an example process of performing block 720 is described above in greater detail in connection with blocks 660 of FIG. 6.

Although FIG. 7 illustrates an example method for an object detection technique by an FRC system various changes could be made to FIG. 7. For example, while shown as a series of blocks, various blocks in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. A method for frame rate conversion, the method comprising:
   determining, by at least one processor, whether a block of a first frame of an input video stream corresponds to a detected object region or a non-object region;
   based at least on the determining of whether the block of the first frame corresponds to the detected object region or the non-object region, selecting a motion estimation operation from a group of operations comprising an object tracking operation;
   determining a motion vector of the block by performing the selected motion estimation operation; and
   determining an interpolated frame based at least on the determined motion vector and the first frame and a second frame of the input video stream.

2. The method of claim 1, wherein:
   the group of operations further comprises a block matching operation, and
   the selecting is in accordance with selecting the object tracking operation based at least on a determination that the block corresponds to the detected object region and selecting the block matching operation based at least on a determination that the block corresponds to the non-object region.

3. The method of claim 1, wherein the determining of whether the block of the first frame of the input video stream corresponds to the detected object region or the non-object region comprises:
   identifying a boundary of the detected object region in each of the first frame and the second frame of the input video stream; and
   identifying a boundary of the block in each of the first frame and the second frame of the input video stream using a block mask.

4. The method of claim 1, wherein the determining of the motion vector of the block comprises:
   generating the motion vector based on a center position of each block of the first frame and the second frame of the input video stream corresponding to the detected object region or the non-object region; and searching the block in accordance with the motion vector to generate an estimated motion vector.

5. The method of claim 4, wherein the motion vector is a block-level motion vector.

6. The method of claim 4, wherein the estimated motion vector is a recursive motion vector.

7. The method of claim 6, wherein the recursive motion vector represents a pixel-level motion of the detected object region.

8. The method of claim 6, wherein the recursive motion vector represents a pixel-level motion of the non-object region.

9. The method of claim 1, further comprising:

displaying the interpolated frame on a display, wherein the display is located in one of a television, a monitor, a laptop computer, a tablet computer, and a mobile phone.

10. An apparatus to convert frame rate, the apparatus comprising:

a memory; and at least one processor operably connected to the memory, the at least one processor configured to:

determine whether a block of a first frame of an input video stream corresponds to a detected object region or a non-object region;

based at least on the determining of whether the block of the first frame corresponds to the detected object region or the non-object region, select a motion estimation operation from a group of operations comprising an object tracking operation;

determine a motion vector of the block by performing the selected motion estimation operation; and determine an interpolated frame based at least on the determined motion vector and the first frame and a second frame of the input video stream.

11. The apparatus of claim 10, wherein:

the group of operations further comprises a block matching operation, and the selection is in accordance with selecting the object tracking operation based at least on a determination that the block corresponds to the detected object region and the selection of the block matching operation based at least on a determination that the block corresponds to the non-object region.

12. The apparatus of claim 10, wherein to determine whether the block of the first frame of the input video stream corresponds to the detected object region or a non-object region, the at least one processor configured is further configured to:

identify a boundary of the detected object region each of the first frame and the second frame of the input video stream; and identify a boundary of the block each of the first frame and the second frame of the input video stream using a block mask.

13. The apparatus of claim 10, wherein to determine the motion vector of the block, the at least one processor configured is further configured to:

generate the motion vector based on a center position of each block of the first frame and the second frame of the input video stream corresponding to the detected object region or the non-object region; and search of the block in accordance with the motion vector to generate an estimated motion vector.

14. The apparatus of claim 13, wherein the motion vector is a block-level motion vector.

15. The apparatus of claim 13, wherein the estimated motion vector is a recursive motion vector.

16. The apparatus of claim 13, wherein the recursive motion vector represents a pixel-level motion of the detected object region.

17. The apparatus of claim 10, further comprising:

a display configured to display the interpolated frame, wherein the apparatus is one of a television, a monitor, a laptop computer, a tablet computer, and a mobile phone.

18. A non-transitory computer readable medium comprising program code, that when executed by at least one processor, causes the at least one processor to:

determine whether a block of a first frame of an input video stream corresponds to a detected object region or a non-object region;

based at least on the determining of whether the block of the first frame corresponds to the detected object region or the non-object region, select a motion estimation operation from a group of operations comprising an object tracking operation;

determine a motion vector of the block by performing the selected motion estimation operation; and determine an interpolated frame based at least on the determined motion vector and the first frame and a second frame of the input video stream.

19. The non-transitory computer readable medium of the claim 18, wherein the program code, that when executed by the at least one processor, causes the at least one processor to determine whether the block of the first frame of the input video stream corresponds to the detected object region or the non-object region comprises program code, that when executed by at least one processor, causes the at least one processor to:

identify a boundary of the detected object region each of the first frame and the second frame of the input video stream; and identify a boundary of the block each of the first frame and the second frame of the input video stream using a block mask.

20. The non-transitory computer readable medium of the claim 18, wherein the program code, that when executed by the at least one processor, causes the at least one processor to determine the motion vector of the block comprises program code, that when executed by at least one processor, causes the at least one processor to:

generate the motion vector based on a center position of each block of the first frame and the second frame of the input video stream corresponds to the detected object region or the non-object region; and search of the block in accordance with the motion vector to generate an estimated motion vector.

* * * * *